T. J. SEWARD.
MACHINE FOR REELING RUBBER COVERED ELECTRIC WIRE FOR VULCANIZATION.
APPLICATION FILED DEC. 28, 1910.
1,008,993.
Patented Nov. 14, 1911.
4 SHEETS—SHEET 1.
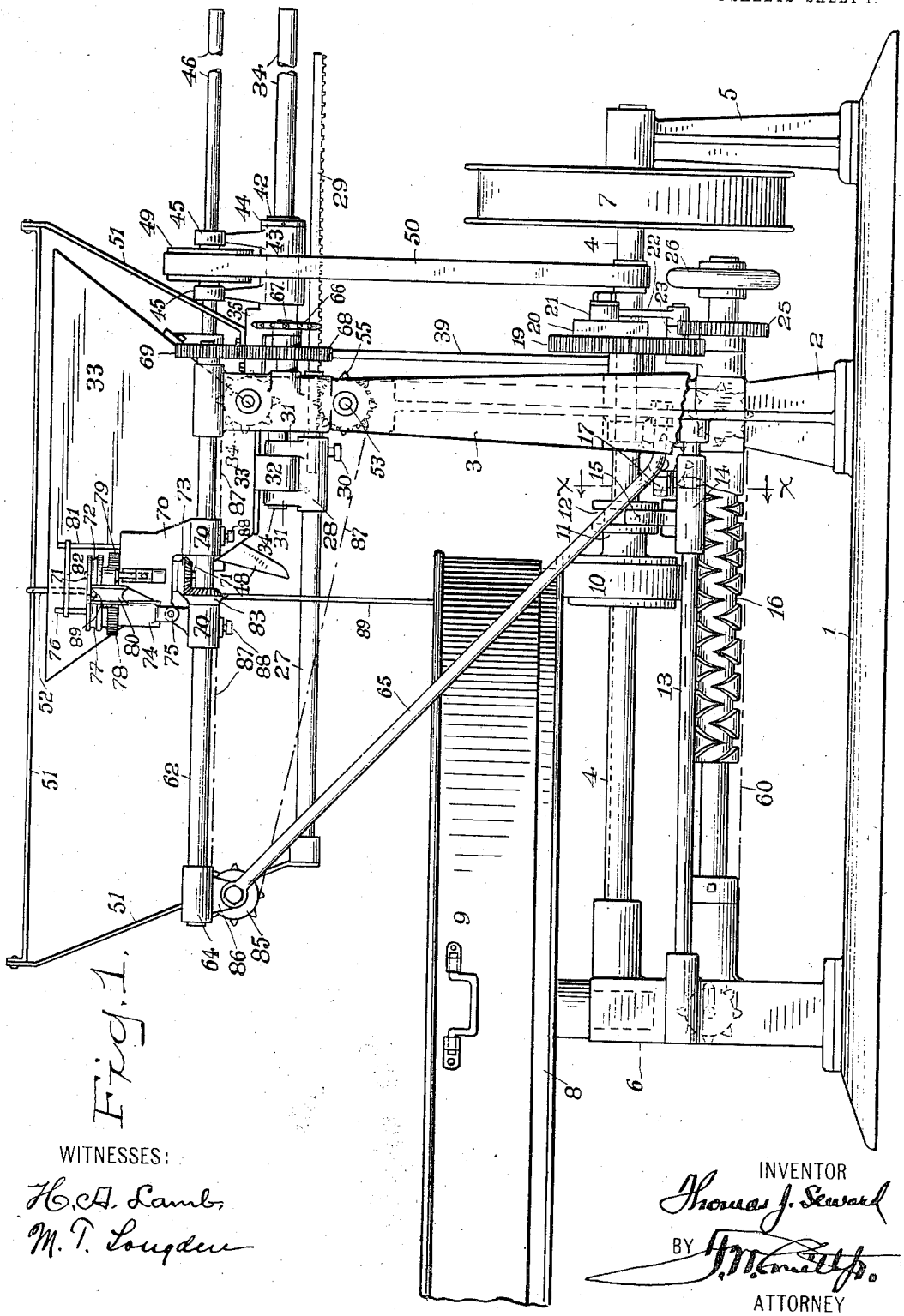
Fig. 1.
WITNESSES:
H. A. Lamb
M. T. Lougden
INVENTOR
Thomas J. Seward
BY 
ATTORNEY T. J. SEWARD.
MACHINE FOR REELING RUBBER COVERED ELECTRIC WIRE FOR VULCANIZATION.
APPLICATION FILED DEC. 28, 1910.

1,008,993.

Patented Nov. 14, 1911.

4 SHEETS—SHEET 4.

WITNESSES:

INVENTOR

ATTORNEY

UNITED STATES PATENT OFFICE.

THOMAS J. SEWARD, OF BRIDGEPORT, CONNECTICUT, ASSIGNOR TO THE ELECTRIC CABLE COMPANY, OF BRIDGEPORT, CONNECTICUT, A CORPORATION OF CONNECTICUT.

MACHINE FOR REELING RUBBER-COVERED ELECTRIC WIRE FOR VULCANIZATION.

1,008,993.            Specification of Letters Patent.      Patented Nov. 14, 1911.

Application filed December 28, 1910. Serial No. 599,656.

*To all whom it may concern:*

Be it known that I, THOMAS J. SEWARD, a citizen of the United States, residing in the city of Bridgeport, county of Fairfield, and State of Connecticut, have invented certain new and useful Improvements in Machines for Reeling Rubber-Covered Electric Wire for Vulcanization; and I do declare the following to be a full, clear, and exact description of the invention, such as will enable others skilled in the art to which it appertains to make and use the same.

My invention has reference to certain new and useful improvements in and relating to machines for reeling rubber covered electric wire for vulcanization, and has for its object to automatically provide a cushioning substance beneath the covered wire as fast as it is coiled, to automatically revolve the pan in which the wire is coiled by a rotary slidable element so controlled as to have a constantly increasing or decreasing sliding movement according as said element slides toward or away from the axis of revolution of said pan, and to automatically associate said rotary element with the devices for delivering the covered wire within the pan and the instrumentalities for delivering the powdered talc in such manner, that said element, devices and instrumentalities will all have synchronous sliding movements whereby the track of said rotary element and the paths in which the wire is coiled and the powdered talc delivered will all be disposed in coinciding spirals.

With these ends in view my invention consists in certain details of construction and combination of parts such as will be hereinafter fully described and then particularly pointed out in the claims which conclude this description.

Figure 2:
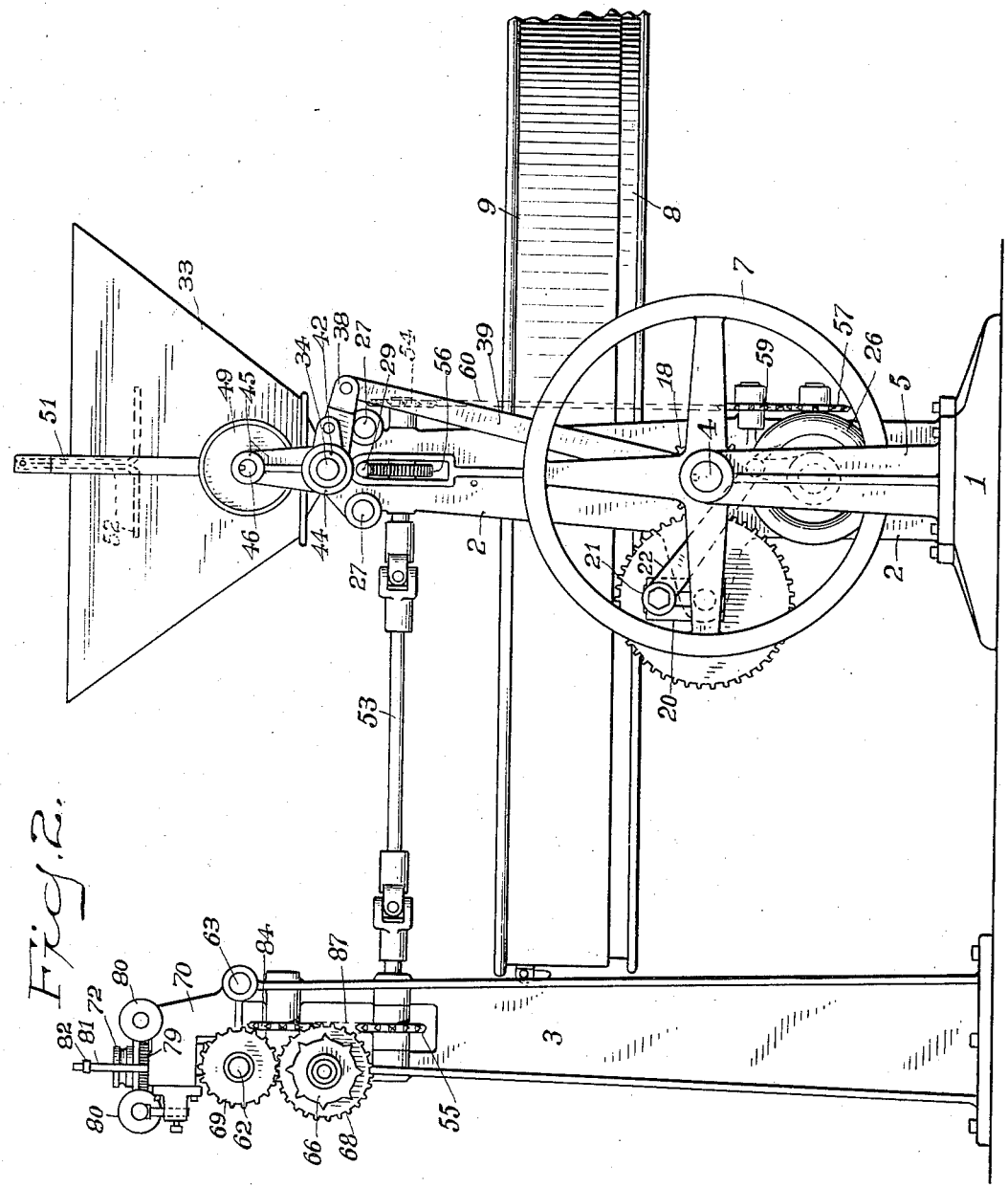
Figure 3:
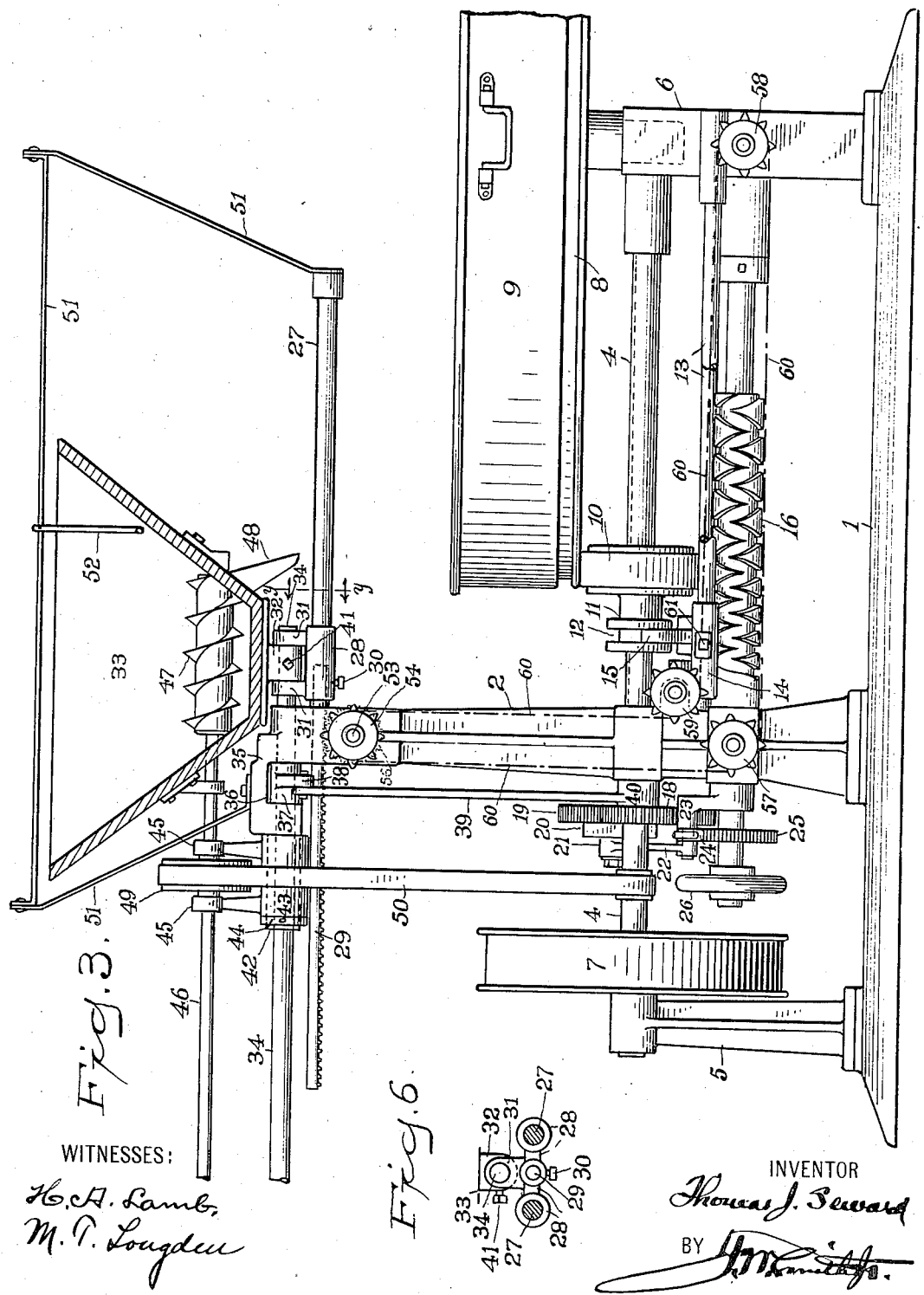
Figure 4:
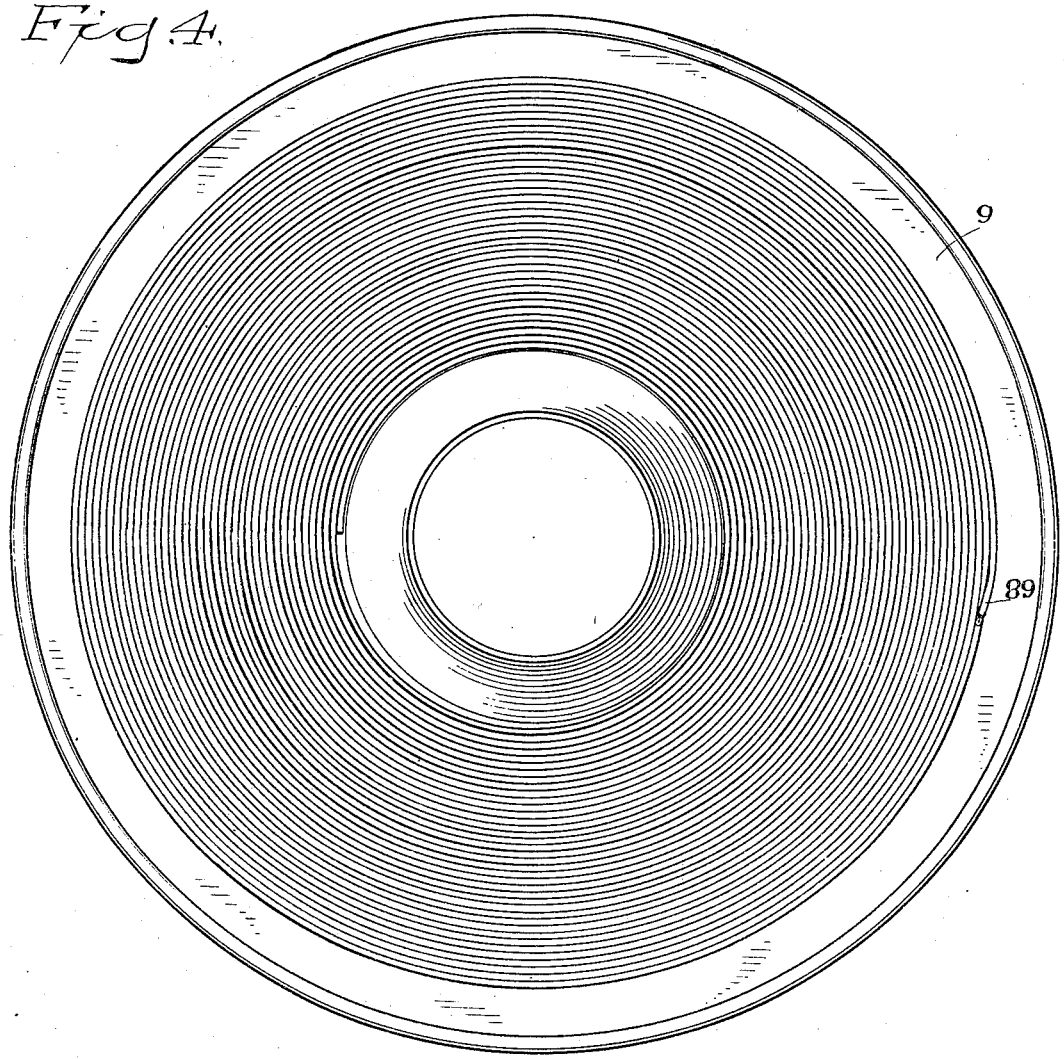
Figure 5:
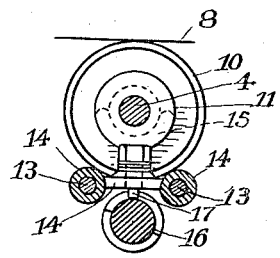

In the accompanying drawings which form a part of this application Figures 1 and 3 are elevations of my improved machine viewed from opposite sides thereof, the parts comprising the talc powder delivering mechanism being omitted in Fig. 3—Fig. 2 an end view—Fig. 4 a detail plan view of the pan showing the wire coiled therein—Fig. 5 a detail section at the line *x*, *x*, of Fig. 1, and Fig. 6 a detail section at the line *y*, *y*, of Fig. 3.

Similar numerals of reference denote like parts in the several figures of the drawing.

Heretofore great difficulty has been experienced in properly delivering and coiling the rubber covered wire within the rotary pan after such wire has left the machine for applying the covering, because the latter is exceedingly soft at this stage and is easily damaged to the extent that the wire invariably breaks down on an electrical test which is due to the damaged insulation. Also, the pan has heretofore been revolved at a varying speed so that the amount of wire delivered may be disposed in spiral coils, but the powdered talc, which is absolutely necessary as a cushion for the wire, has been delivered by hand, the result being that such talc has necessarily been unevenly distributed so that the cushion thereby afforded would be in ridges, the consequence being that the wire would not be evenly supported and the coils would not lie flat within the pan. This defect in the cushioning of the wire has been very marked as the wire is coiled in reverse spirals so as to assume the form of a reel prior to vulcanization, and the slightest sagging of the wire due to this uneven cushion support will cause the insulation to be thin in spots to the extent that the wire is considered defective.

My invention aims to overcome these defects and to provide an apparatus by which the cushion of powdered talc is automatically and evenly distributed beneath the wire as fast as it is coiled, and will be best understood from the following description:—

My improvement comprises three slidable carriages which convey respectively a rotary element which revolves the pan in which the wire is coiled, rolls for feeding the covered wire and devices which deliver powdered talc, and said carriages are so connected together in one system that they will have synchronous sliding movements whereby the track of said rotary element and the paths in which the wire is coiled and the powdered talc delivered are all disposed in coinciding spirals.

1 is the bed of the machine, and 2, 3, are spaced columns rising therefrom.

4 is the power shaft journaled within uprights 5, 6, rising from the bed and 7 is the power pulley carried by said shaft.

8 is a rotary platform suitably mounted on the upright 6, and 9 represents the wire receiving pan which rests upon said platform.

Splined upon the shaft 4 so as to have rotary movements therewith and at the same time be capable of sliding freely therealong is a pulley 10 which has a leather or other surface possessing suitable friction qualifications, and 11 is a hub extending from this pulley and having an annular groove 12.

13 are spaced parallel guide rods secured to the column 2 and upright 6, 14 is a carriage adapted to slide freely on said rods, and 15 is a yoke which embraces the grooved portion of the hub 11 and is connected with said carriage whereby the sliding movements of the carriage will be communicated to the pulley 10.

16 is a rotary reverse differential screw suitably journaled within the column 2 and upright 6 and engaging with this screw is a pin 17 that is secured to the carriage 14. The pitch of this screw is differential so that when the pin 17 is engaged at one end of the screw the sliding movement of the carriage 14 and consequently of the pulley 10 will be comparatively slow, while the revolution of this screw when said pin is engaged at the other end thereof will impart a quicker sliding movement to said carriage and pulley.

The pulley 10 frictionally engages the bottom surface of the platform 8 and as the pulley revolves rotary motion will be imparted to said platform, and the pitch of the screw is such that when the pulley engages the outer periphery of said platform, as shown at Fig. 3, the sliding movement of said pulley toward the axis of revolution of the platform will be very slow, while, as the pin 17 continues to advance along the screw the sliding movements of said pulley will be quicker, and such movements will be constantly accelerated as the pulley approaches the axis of revolution of said platform. This peculiar sliding movement of the pulley is absolutely necessary, since, when the pulley is engaged with the platform near the axis of revolution of the latter, the platform will be revolved at its greatest speed, and therefore a given amount of wire will be disposed of in two or three of the coils of the spiral, so that it becomes necessary to slide this pulley quickly, and therefore the speed at which the platform is revolved is quickly decreased in order that the precise amount of wire delivered within the pan may be coiled, all of which will be hereinafter more fully described.

The screw is continuously revolved by means of a pawl and ratchet construction which is quite ordinary requiring only a brief description. A spur gear 18 on the power shaft 4 meshes with a large spur 19 idly journaled to the column 2 and carrying on its outer side face a channeled block 20 within which is adjustably secured a stud 21 from which extends an arm 22 whose outer extremity is pivoted to a crank 23 that is swiveled around the screw shaft, a spring actuated pawl 24 being carried by said crank and adapted to engage with a ratchet wheel 25 secured to the shaft of the screw so that it will be readily understood that the rotary movement of the gear 19 will intermittently revolve the screw. Of course it will be clear that the nearer the stud 21 is adjusted toward the axial center of the gear 19 the slower will be the revolution of the screw owing to the fact that the pawl will have a correspondingly decreased throw. Any suitable hand wheel 26 is secured to the outer end of the screw shaft whereby the latter may be rapidly revolved to adjust the pulley 10 to any desired position with respect to the platform 8.

27 are spaced parallel guide rods secured to the upper portion of the column 2, and 28 is a slidable carriage guided by said rods and having projecting therefrom a rack bar 29 which is secured to the carriage by means of set screw 30. From this carriage rise spaced ears 31 between which extends a perforated lug 32 which is rigidly attached to and depends from the bottom of a hopper 33, and 34 is a round rod slidably guided within horizontally disposed bearings at the top of the column 2, and passing through said ears 31 and lug 32.

The top of the column 2 has a laterally extending portion 35 to afford bearings for the rod 34, and this portion 35 is recessed as shown at 36, and within this recessed portion is a collar 37 which is splined on the rod 34, so that said rod may slide freely through said collar, and extending from the latter is an ear 38 to which is pivoted an arm 39 which extends upwardly from a collar 40 that is eccentrically disposed around the power shaft, so that it will be clear that as the power shaft revolves rocking movements will be imparted to the collar 37 and consequently to the rod 34.

The lug 32 is secured to the rod 34 by means of a set nut 41, so that it will be evident that the hopper will partake of any rocking movements imparted to the rod 34, and the latter is perfectly free within the ears 31, so that it will be understood that the carriage 28 will be free to slide along the guide rods 27 during the rocking movements of the rod 34.

The lateral extension 35 terminates in a circular bushing 42 which is loosely surrounded by a sleeve 43 retained in position by an ordinary lock collar 44, and rising from this sleeve are spaced bearings 45 within which is journaled a shaft 46 which extends freely through the hopper and has secured thereto on the portion that is contained within the hopper a skein screw 47 that is pitched toward a spout 48 that leads downwardly from the hopper and overhangs the pan 9.

49 is a pulley splined on the shaft 46 and located between the bearings 45 and connected with the power shaft by means of a belt 50.

51 is a stiffening frame surrounding the hopper and secured to the extension 35 and the ends of the guide rods 27, and depending within the hopper from the upper portion of this frame is an agitating finger 52.

From the above description it will be manifest that the shaft 46 will not be cramped or strained in the slightest by the rocking movements of the hopper, since the sleeve 43 is perfectly loose around the bushing 42, and it will be further manifest that during the to and fro sliding movements of the carriage 28, the finger 52 will pass through the powdered talc contained within said hopper and will thoroughly agitate it thereby insuring its ready delivery to the screw 47 so that it may be continuously discharged through the spout 48, the action of this screw serving to constantly force the powder toward the spout, while the finger sufficiently agitates the powder to prevent caking or clinging to the sides of the hopper.

The sliding movements of the carriage 28 are effected by means of the following instrumentalities:—53 is a shaft journaled within and extending between the upper ends of the columns 2, 3, and carrying at opposite ends sprockets 54, 55. 56 is a pinion carried by this shaft 53 and in mesh with the rack 29. 57 is an idler sprocket journaled to the column 2 near the bottom thereof immediately below the sprocket 54. 58 is also an idler sprocket journaled to the upright 6, and 59 is a similar sprocket journaled to the column 2 at one side thereof and immediately above the carriage 14. 60 represents a sprocket chain which is secured to the carriage 14 by means of an ordinary set block 61, said chain extending from the block above the screw 16 around the sprocket 58, thence below the screw around the sprocket 57, then upwardly around the sprocket 54, and finally downwardly around the sprocket 59 back to the carriage 14, so that it will be clear that when said carriage slides inwardly toward the axis of rotation of the platform 8 the pinion 56 will engage the rack bar and cause the hopper to likewise slide in the same direction, and the spout 48 and pulley 10 will both gradually approach the axis of rotation of said platform in coinciding planes; also, when said carriage 14 slides outwardly toward the periphery of the platform the hopper will slide in the same direction so that the spout 48 and pulley 10 will gradually approach said periphery in coinciding planes. It will likewise be clear from the above description that the powdered talc within the hopper will be deposited within the pan in a spiral path which coincides with the spiral path described by the pulley 10, and the remaining feature to be explained relates to the proper delivery of the covered wire so that the latter will be coiled within the pan coincidently with said paths.

Referring particularly to Figs. 1 and 2, 62, 63, are spaced parallel guide rods which extend from the upper end of the column 3 the outer extremities of these rods being housed within a socket block 64, a brace rod 65 being secured to said block and the column 3 for the purpose of stiffening said rods. The rod 63 is stationary while the rod 62 is journaled within the block 64 and column 3 so as to be capable of free rotation.

66 is a sprocket wheel carried by a short shaft 67 that is journaled at the side of the column 3, and 68 is a spur gear likewise carried by said shaft and meshing with a spur gear 69 carried by the rod 62, so that it will be obvious that the rotation of the sprocket 66 will cause the rod 62 to revolve.

70 is a carriage guided on the rods 62, 63, and capable of free sliding movements therealong, and 71 is a vertically disposed short shaft journaled within said carriage and having feed roll 72 secured to its upper end and bevel gear 73 secured to its lower extremity.

74 is a block pivoted at 75 to the carriage 70 and within this block is fixed a vertically disposed pin 76 around which is a loose feed roll 77 having rigid therewith a spur gear 78 which meshes with a spur gear 79 that is rigid with the roll 72. These feed rolls 72, 77, are horizontally disposed, and it will be clear that the revolution of the bevel gear 73 will impart rotary feeding movements to these rolls in the usual manner.

80 are idle guide rolls vertically disposed in the front and rear of the feed rolls 72, 77, and journaled on the carriage 70, the covered wire being led through the rolls 72, 77, and over the guide rolls 80.

81 is a pin extending upwardly from the carriage 70 and around this pin and the pin 76 is an ordinary elastic band 82 which causes the roll 77 to embrace the wire with a resilient action, all of which is very ordinary and may be effected in other ways requiring no invention.

83 is a bevel gear splined on the rod 62 and in mesh with the bevel gear 73 so that it will be evident that as the sprocket 66 revolves proper rotations will be communicated to the rolls 72, 77, in order to feed the covered wire.

84 is an idle sprocket wheel journaled within the upper portion of the column 3 immediately above the sprocket 55, and 85 is likewise an idle sprocket journaled to a lug 86 extending downwardly from the block 64, and around the sprockets 55, 84, and 85, is a sprocket chain 87 which is firmly secured to the carriage 70 by means of set blocks 88, so that it will be clear that, as the shaft 63 is revolved, the chain 87 will pull the carriage back and forth according to the direction in which the sprocket 54 is turned.

The power shaft 4, screw 16, guide rods 27, and guide rods 62, 63, are all parallel so that the carriages 14, 28, and 70 are all slidable in the same direction, the sliding movements of these three carriages being synchronous by reason of the fact that the carriages 28 and 70 are actuated directly from the carriage 14 by reason of the sprocket and chain connections heretofore described, and therefore as the covered wire, which I will denote by the numeral 89, is fed from the rolls 72, 77, the plane of delivery of said wire within the pan 9 will constantly approach the periphery or the center of the pan, according as the case may be, in a spiral path, which is coincident with the spiral path in which the powder is delivered from the spout 48 and the spiral track of the pulley 10 against the bottom of the platform 8, and the angular disposition of the spout 48 is such that the powder will be deposited beneath the wire as fast as the latter is coiled.

The sprocket 66 is connected to the capstan of the wire covering machine (not shown) which forms no part of the present invention, so that the amount of wire fed by the rolls 72, 77, will correspond with the amount of wire covered by said machine, and the revolution of the screw 16 is such that the pan 9 will be revolved at a speed just sufficient to take up the wire as fast as it is fed. The screw 16 has a double or reverse thread, so that when the pin 17 has reached one end of the screw it will immediately track within the reverse thread and the various sliding movements will be reversed, and this will cause the wire to be coiled, first, from the central portion of the pan toward the periphery, then in superimposed layers from the periphery toward the center, and so on until there is a sufficient number of superimposed coils with the separating cushion of talc powder requisite to form the reel desired, and then the wire is cut and the pan containing said reel removed for vulcanization and another pan substituted.

Having thus described my invention what I claim as new and desire to secure by Letters Patent is:—

1. In a machine for reeling rubber covered electric wire for vulcanization, the combination of devices for coiling the wire in reverse superimposed spiral coils, of automatic means operating in harmony with said devices for continuously depositing powdered talc beneath the wire as fast as the latter is coiled.

2. A machine for reeling rubber covered electric wire for vulcanization, comprising a rotary platform, a pan supported thereon, means for revolving said platform at a varying speed which constantly increases and decreases according as the wire is coiled toward and away from the center of rotation, mechanism operated in synchronism with said means for disposing the wire within said pan in reverse superimposed spiral coils, and devices operated in synchronism with said mechanism for continuously depositing powdered talc beneath and in the path of said wire.

3. A machine for reeling rubber covered electric wire for vulcanization, comprising three slidable carriages which convey respectively rolls for feeding the covered wire, a rotary element which revolves the pan in which the wire is coiled and devices which deliver powdered talc, said carriages connected together in one system so that they will all have synchronous sliding movements whereby the track of said rotary element and the paths in which the wire is coiled and the powdered talc delivered are all disposed in coinciding spirals.

4. In a machine for reeling rubber covered electric wire for vulcanization, the combination of a rotary platform, a pan supported thereon, a rotary slidable friction pulley which engages the under surface of said platform, a rotary reverse differential screw, connections between said pulley and screw whereby the latter will govern the sliding movements of the former, means for feeding the covered wire, mechanism actuated and governed by the sliding movements of said pulley for delivering said wire within the pan whereby during the revolution of the latter said wire will be disposed in spiral coils, and means likewise operated and governed by the sliding movements of said pulley for continuously depositing powdered talc beneath and in the path of said wire.

5. In a machine for reeling rubber covered electric wire for vulcanization, the combination of a rotary platform, a pan supported thereon, a power shaft, a friction pulley engaging the under surface of said platform and rigid with said shaft as to rotation but capable of sliding movements therealong and provided with a hub having an annular groove, a guided carriage, connections between said carriage and hub whereby said pulley and carriage are united as to sliding movements, a rotary reverse differential screw, connections between said screw and carriage whereby sliding movements will be communicated to the latter as the screw revolves, a hopper containing powdered talc and provided with a delivery spout overhanging said pan, a guided slidable carriage having a rack bar extending therefrom, a rocking connection between said hopper and carriage, means operated from the power shaft for rocking said hopper, and a pinion engaging said rack and operated by direct connection with the first named carriage whereby the sliding movements of said hopper and pulley will be synchronous.

6. In a machine for reeling rubber covered electric wire for vulcanization, the combination of a rotary platform, a pan supported thereon, a power shaft, a friction pulley engaging the under surface of said platform and rigid with said shaft as to rotation but capable of sliding movements therealong and provided with a hub having an annular groove, a guided carriage, connections between said carriage and hub whereby said pulley and carriage are united as to sliding movements, a rotary reverse differential screw, connections between said screw and carriage whereby sliding movements will be communicated to the latter as the screw revolves, a hopper containing powdered talc and provided with a delivery spout overhanging said pan, a guided slidable carriage having a rack bar extending therefrom, a rocking connection between said hopper and carriage, means operated from the power shaft for rocking said hopper, a pinion engaging said rack and operated by direct connection with the first named carriage whereby the sliding movements of said hopper and pulley will be synchronous, a shaft journaled within the lower part of said hopper and carrying a feed screw, rocking journals for said shaft, connections between said shaft and power shaft whereby the latter will communicate motion to the former, and a finger suspended within said hopper, whereby as the hopper slides the powder therein will be delivered to the spout by the screw and agitated by the finger.

7. In a machine for reeling rubber covered electric wire for vulcanization, the combination of a rotary platform, a pan supported thereon, a power shaft, a friction pulley engaging the under surface of said platform and rigid with said shaft as to rotation but capable of sliding movements therealong and provided with a hub having an annular groove, a guided carriage, connections between said carriage and hub whereby said pulley and carriage are united as to sliding movements, a rotary reverse differential screw, connections between said screw and carriage whereby sliding movements will be communicated to the latter as the screw revolves, a second guided carriage, suitable feed rolls for the wire supported on said second carriage, means for revolving said rolls whereby the covered wire is delivered, and direct connections between said carriages whereby the wire will be deposited and disposed within the pan in a path coincident with the track of said pulley against the platform.

8. A machine for reeling rubber covered electric wire for vulcanization, comprising a rotary platform, a pan supported thereby, a slidable rotary pulley engaging the under surface of said platform, a hopper containing powdered talc and provided with a spout overhanging said pan, feed rolls for delivering the covered wire, three slidable guided carriages connected respectively to said pulley, hopper and rolls, direct connections between said carriages whereby they will all move in synchronism, a rotary reverse differential screw, and connections between said screw and pulley whereby as the latter revolves it will have a variable sliding movement thereby causing the talc powder and wire to be disposed in said pan in spiral coils one beneath the other.

In testimony whereof I affix my signature in presence of two witnesses.

THOMAS J. SEWARD.

Witnesses:
F. W. SMITH, Jr.,
M. T. LONGDEN.